United States Patent
Ungstrup et al.

(10) Patent No.: US 10,264,368 B2
(45) Date of Patent: *Apr. 16, 2019

(54) HEARING AID HAVING AN ADAPTIVE CLASSIFIER

(71) Applicant: Widex A/S, Lynge (DK)

(72) Inventors: Michael Ungstrup, Allerod (DK); Mike Lind Rank, Farum (DK)

(73) Assignee: Widex A/S, Lynge (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,527

(22) Filed: Nov. 13, 2017

(65) Prior Publication Data

US 2018/0070186 A1 Mar. 8, 2018

Related U.S. Application Data

(60) Division of application No. 15/047,706, filed on Feb. 19, 2016, now Pat. No. 9,883,297, which is a
(Continued)

(51) Int. Cl.
*H04R 25/00* (2006.01)
*H04W 4/80* (2018.01)
*H04B 1/3827* (2015.01)

(52) U.S. Cl.
CPC ......... *H04R 25/554* (2013.01); *H04B 1/3827* (2013.01); *H04R 25/70* (2013.01);
(Continued)

(58) Field of Classification Search
CPC .. H04R 25/554; H04R 25/405; H04R 25/407; H04R 3/005; H04R 2201/40;
(Continued)

(56) References Cited

U.S. PATENT DOCUMENTS 6,870,940 B2 3/2005 Meyer et al.
7,804,974 B2 9/2010 Paludan-Muller et al.
(Continued)

FOREIGN PATENT DOCUMENTS

EP 1698908 A2 9/2006
EP 1 713 302 A1 10/2006
(Continued)

OTHER PUBLICATIONS

Enrique Alexandre, et al., "Speech/Music/Noise Classification in Hearing Aids Using a Two-Layer Classification System With Mse Linear Discriminants", Department of Signal Theory and Communicaciones, University of Alcala Escuela Politecnica Superior, 28805, Alcala de Henares (Madrid), Spain, 16th European Signal Processing Conference (EUSIPCO 2008), Lausanne, Switzerland, Aug. 25-29, 2008, pp. 1-5.
(Continued)

*Primary Examiner* — Brian Ensey
(74) *Attorney, Agent, or Firm* — Sughrue Mion, PLLC

(57) ABSTRACT

A hearing system includes a hearing aid (10) and personal communication device (20) connected via a short range data communication link. The hearing aid (10) has a signal processor (13) processing an audio signal according to audio processing parameters, a sub-system applying respective sets of processing parameters for at least two modes, a classifier component (51) statistically analyzing the environment by comparing specific characteristics of an electrical input signal to one or more thresholds. A program selector component (16) selects automatically an appropriate mode for the signal processing sub-system according to the classifier output. The personal communication device (20) offers the user an interface for controlling and interacting with the program selector component (16) of the hearing aid (10), and for generating and transmitting a
(Continued)

notification to the hearing aid (10). Upon reception of the notification, the processor (13) adjusts at least one of the one or more thresholds used by the classifier component (51).

19 Claims, 6 Drawing Sheets

Related U.S. Application Data continuation-in-part of application No. PCT/EP2013/067272, filed on Aug. 20, 2013.

(52) U.S. Cl.
CPC .............. *H04W 4/80* (2018.02); *H04R 25/305* (2013.01); *H04R 25/353* (2013.01); *H04R 25/453* (2013.01); *H04R 25/558* (2013.01); *H04R 2225/39* (2013.01); *H04R 2225/41* (2013.01); *H04R 2225/55* (2013.01); *H04R 2460/07* (2013.01)

(58) Field of Classification Search
CPC ............ H04R 2225/43; H04R 2225/51; H04R 2225/55; H04R 2420/07; H04R 2430/23
See application file for complete search history.

(56) References Cited

U.S. PATENT DOCUMENTS

| | | | |
|---|---|---|---|
| 7,853,030 | B2 | 12/2010 | Grasbon et al. |
| 8,411,888 | B2 | 4/2013 | Nielsen |
| 8,611,570 | B2 | 12/2013 | Neumeyer et al. |
| 9,094,769 | B2 | 7/2015 | Bisgaard et al. |
| 9,210,517 | B2 * | 12/2015 | Pontoppidan .......... H04R 25/00 |
| 9,560,437 | B2 | 1/2017 | Jaffe et al. |
| 2006/0182294 | A1 | 8/2006 | Grasbon et al. |
| 2006/0215860 | A1 | 9/2006 | Wyrsch |
| 2010/0189293 | A1 | 7/2010 | Imamura et al. |
| 2011/0176697 | A1 | 7/2011 | Apfel et al. |
| 2011/0235835 | A1 | 9/2011 | Bulow et al. |
| 2011/0293123 | A1 | 12/2011 | Neumeyer et al. |
| 2012/0095528 | A1 | 4/2012 | Miller, III et al. |
| 2012/0183165 | A1 | 7/2012 | Foo et al. |
| 2013/0070928 | A1 | 3/2013 | Ellis et al. |

FOREIGN PATENT DOCUMENTS

| | | |
|---|---|---|
| EP | 1 720 375 A1 | 11/2006 |
| EP | 2 276 271 A1 | 1/2011 |
| EP | 2 884 766 A1 | 6/2015 |
| WO | 2009/001559 A1 | 12/2008 |
| WO | 2009/049672 A1 | 4/2009 |
| WO | 2011/159349 A1 | 12/2011 |
| WO | 2014/053023 A1 | 4/2014 |
| WO | 2014/126415 A1 | 8/2014 |
| WO | 2014/157846 A1 | 10/2014 |
| WO | 2015/068927 A1 | 5/2015 |

OTHER PUBLICATIONS

International Search Report for PCT/EP2013/067269 dated Mar. 21, 2014.

International Search Report for PCT/EP2013/067276 dated Apr. 10, 2014 [PCT/ISA/210].

International Search Report of PCT/EP2013/067272, dated Apr. 8, 2014. [PCT/ISA/210].

Michael Buchler, et al., "Sound Classification in Hearing Aids Inspired by Auditory Scene Analysis", EURASIP Journal on Applied Signal Processing 2005, pp. 2991-3002, No. 18.

Michal Wozniak et al., "Combined Classifier Based on Feature Space Partitioning", Int. J. Appl. Math. Comput. Sci., 2012, pp. 855-866, vol. 22, No. 4.

Peter Nordqvist, "Sound Classification in Hearing Instruments", Doctoral Thesis, Stockholm 2004, KTH Signaler, sensorer och system Ljud- och bildbehandling SE-100 44 Stockholm Sweden, pp. 1-118.

Silvia Allegro, et al., "Automatic Sound Classification Inspired by Auditory Scene Analysis", Department of Otorhinolaryngology, University Hospital Zurich, Switzerland, In Consistent and Reliable Acoustic Cues for Sound Analysis (CRAC), Aalborg, Denmark, 2001., pp. 1-4.

Written Opinion for PCT/EP2013/067269 dated Mar. 21, 2014.

Written Opinion of PCT/EP2013/067272, dated Apr. 8, 2014. [PCT/ISA/237].

Written Opinion of PCT/EP2013/067276, dated Apr. 10, 2014. [PCT/ISA/237].

* cited by examiner

HEARING AID HAVING AN ADAPTIVE CLASSIFIER

CROSS-REFERENCE TO RELATED APPLICATIONS

The present application is a divisional of U.S. application Ser. No. 15/047,706 which is a continuation-in-part of application No. PCT/EP2013/067272 filed on Aug. 20, 2013, and published as WO2015024585 A1, the disclosures of all of which are incorporated herein by reference in their entirety.

BACKGROUND OF THE INVENTION

1. Field of the Invention

The present invention relates to hearing aids. The invention, more particularly, relates to a hearing system having a classifier classifying an auditory environment and selecting a mode of operation for one or more signal processing sub-systems each having at least two modes of operation. The hearing system includes a hearing aid and a personal communication device. Also, the invention relates to a method of controlling program selection in a hearing aid.

2. Prior Art

Basically, a hearing aid has a microphone for converting sound into an electric signal, and an amplifier for alleviating the hearing loss of the user and a receiver for converting the amplified electric signal into sound again. Modern, digital hearing aids comprise sophisticated and complex signal processing units for processing and amplifying sound according to a prescription aimed at alleviating a hearing loss for a hearing impaired individual. The major purpose of a hearing aid is to improve speech intelligibility. State of the art hearing aids have features for recognizing speech and suppressing noise in an audio signal picked up by the hearing aid. A useful element in the statistical analyses is percentile levels. Percentile levels provide information on the level distribution, that is, how the loudness level of the incoming signal changes over time. When obtained for multiple frequencies, this information provides quite a detailed picture of the auditory environment. U.S. Pat. No. 7,804,974 B and U.S. Pat. No. 8,411,888 B describe the operation of a hearing aid classifier in details.

The purpose of the invention is to provide an improved classifier for program selection in a hearing aid wherein the risk of undesired program changes is minimized.

SUMMARY OF THE INVENTION

This purpose is achieved by a hearing system according to the invention including a hearing aid and a personal communication device. According to a first aspect of the invention there is provided a hearing system including a hearing aid and a personal communication device both including a short range data transceiver for providing a short range data communication link. The hearing aid includes a signal processor processing an electric input signal according to audio processing parameters of the hearing aid, and a classifier component analyzing at least one specific characteristic of said electric input signal statistically, said statistical analysis includes comparison of said at least one specific characteristic to one or more thresholds. A program selector component automatically selects one of at least two modes of operation for a signal processing sub-system according to the classifier's classification. The thresholds are controlled by the signal processor. The personal communication device offers the user a user interface for controlling and interacting with a program selector component of the hearing aid, and generating a notification according to the operation of the user interface and transmitting the notification to said hearing aid via said short range data communication link. Upon reception of the notification from said personal communication device, the processor adjusts at least one of said one or more thresholds used by the classifier component.

According to a second aspect of the invention there is provided a method of selecting one of at least two modes of operation for a signal processing sub-system for a hearing aid including a signal processor processing an electric input signal according to audio processing parameters of the hearing aid. The method includes connecting a personal communication device to the hearing aid by means of a short range data communication link, analyzing in a classifier at least one specific characteristic of said electric input signal statistically in order to determine the acoustic environment of the hearing aid, said statistical analysis including comparison of at least one specific to one or more thresholds, and offering the user by means of said personal communication device a user interface for controlling and interacting with a program selector component of the hearing aid. The method furthermore includes steps of generating a notification according to the operation of the user interface and transmitting the notification to said hearing aid via said short range data communication link, and adjusting at least one of said one or more thresholds used by the classifier component upon reception of the notification from said personal communication device.

According to a third aspect of the invention there is provided a hearing aid communicating with the personal communication device via a short range data communication link. The hearing aid includes a signal processor processing an electric input signal according to audio processing parameters of the hearing aid, a classifier component analyzing at least one specific characteristic of said electric input signal statistically, said statistical analysis including comparison of at least one specific characteristic to one or more thresholds, and a program selector component automatically selecting one of at least two modes of operation for a signal processing sub-system according to said statistical analysis performed by the classifier component. The signal processor is adapted to receive a notification from said personal communication device and initiated by a user operating a user interface allowing the user to control said program selector component, and to adjust the thresholds of the classifier component upon reception of the notification from said personal communication device.

According to a fourth aspect of the invention there is provided a hearing aid including a signal processor processing an electric input signal according to audio processing parameters of the hearing aid, a feature extractor for extracting value representations relating to at least one specific characteristic for said samples of said electric input signal, and a classifier component analyzing said value representations statistically by comparing said value representations to one or more thresholds for said at least one specific characteristic. The signal processor furthermore analyzes the statistical distribution of said value representations for evaluating the homogeneity of the auditory environment. When the signal processor recognizes the auditory environment as being homogeneous, the signal processor compares the mean value of the distribution to the threshold for said at least one specific characteristic. When the signal processor recognizes the difference between the mean value and one of said one or more thresholds to be below a first predetermined value, the signal processor adjust the thresholds so said difference at least corresponds to said first predetermined value.

According to a fifth aspect of the invention there is provided a method of classifying an acoustic environment for a hearing aid including a signal processor processing an electric input signal according to audio processing parameters of the hearing aid. The method includes extracting in a feature extractor value representations relating to at least one specific characteristic for said samples of said electric input signal, analyzing in a classifier component said value representations statistically by comparing said value representations to one or more thresholds for said at least one specific characteristic, and analyzing in the signal processor the statistical distribution of said value representations for evaluating the homogeneity of the auditory environment. When the signal processor has recognized the auditory environment as being homogeneous, the signal processor furthermore compares the mean value of the distribution to said one or more thresholds for said at least one specific characteristic, and when the signal processor has recognized that the difference between the mean value and one of said one or more thresholds is below a first predetermined value, the signal processor adjusts one of said one or more thresholds so said difference at least corresponds to said first predetermined value.

BRIEF DESCRIPTION OF THE DRAWINGS

The invention will be described in further detail with reference to preferred aspects and the accompanying drawing, in which.

DETAILED DESCRIPTION OF THE INVENTION

Figure 1:
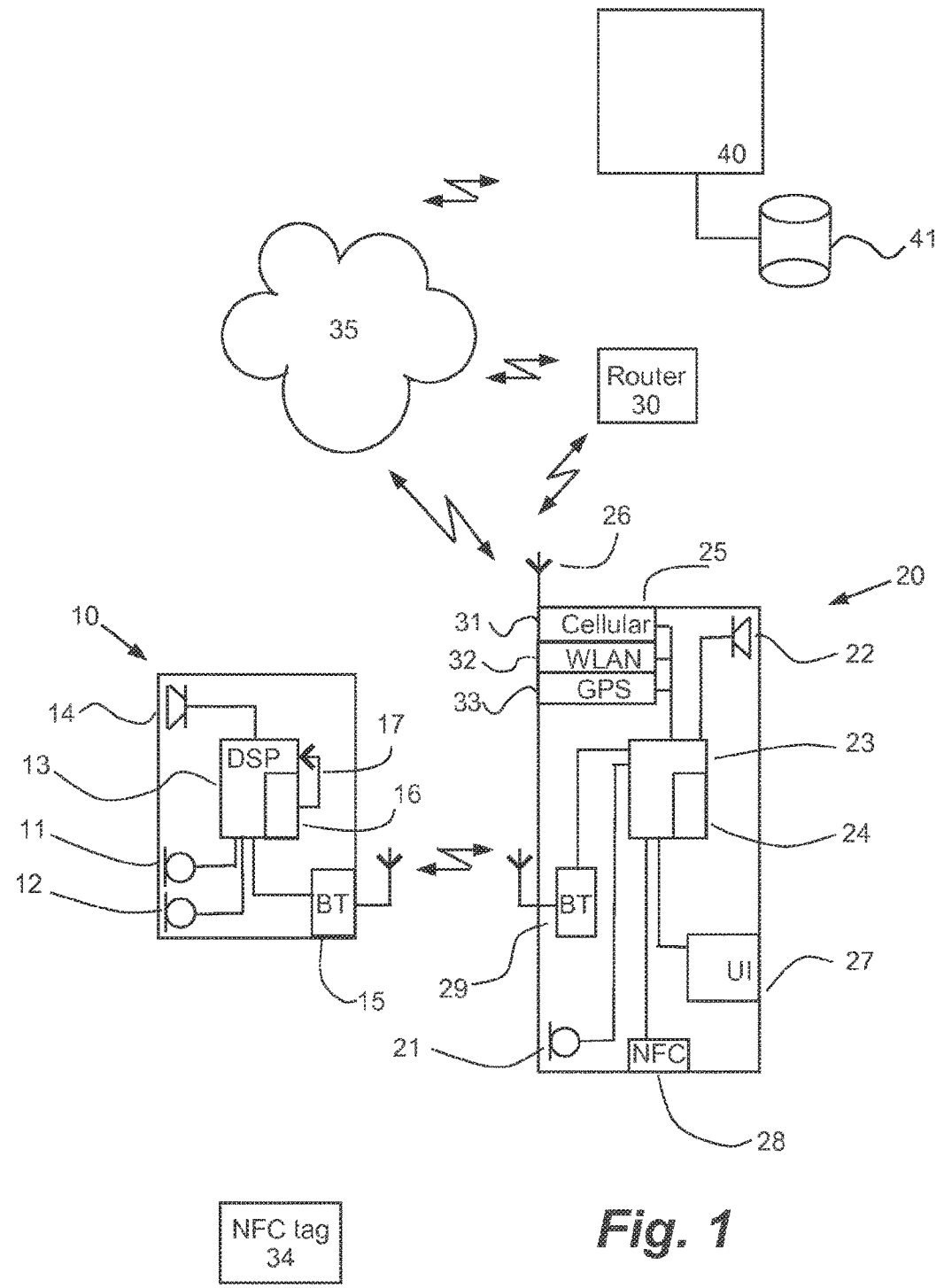
FIG. 1 illustrates schematically a hearing aid system according to an embodiment of the invention.

Reference is made to FIG. 1, which schematically illustrates a hearing system according to an embodiment of the invention. Prior to use, the settings of the hearing aid is set and adjusted by a hearing care professional according to a prescription. The prescription is provided by an audiologist and is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit.

A hearing aid 10 comprises two input transducers 11, 12 for picking up the acoustic sound and converting it into electric signals. The electric signals from the two transducers 11, 12 are led to a Digital Signal Processing (DSP) unit 13 for amplification and conditioning according to a predetermined setting set by an audiologist. An advantage of having a dual microphone system is that it makes it possible to perform spatial filtering. The input signal is preferably split into a number of narrow frequency bands which can then be processed separately. The Digital Signal Processing (DSP) unit 13 delivers an amplified and conditioned electrical output signal to a speaker or an output transducer 14. Preferably Delta-Sigma-conversion is applied in the signal processing so the electrical output signal is formed as a one-bit digital data stream fed directly to the output transducer 14, whereby the hearing aid 10 drives the output transducer 14 as a class D amplifier.

The hearing aid 10 includes a standard hearing aid battery (not shown) as power supply and may in addition also include a tele-coil (not shown) for picking up a broadcasted electromagnetic signal.

The Digital Signal Processing (DSP) unit 13 includes an automatic program selector component 16 that analyzes the incoming audio signal and selects the hearing aid program accordingly or adjusts the setting thereof which is indicated by a control signal 17. Furthermore, the hearing aid 10 includes a connectivity component 15 for communication with a personal communication device 20. The connectivity component 15 operates preferably according to the Bluetooth Core Specification version 4.0—also known as Bluetooth Low Energy. Such connectivity components 15 are commercially available as a dedicated chip from various manufacturers, and by including such a component into a hearing aid, it becomes possible to connect the hearing aid to the Internet via a connection to a smartphone, a tablet computer or other types of external communication devices and to get the benefits from such a connection.

The personal communication device 20 may access an external server 40 via the Internet 35, and download a piece of application software (app) dedicated for the hearing aid 10. When run on the personal communication device 20, the application software according to the invention provides a functionality of an external auxiliary classifier 24. The classifier 16 analyzes the auditory environment, while the external auxiliary classifier 24 analyzes the user position and behavior, and may also retrieve information about acoustic characteristics of the surroundings. The auxiliary classifier 24 may extract the position data of the personal communication device 20 as these data are available from the processor 23.

The personal communication device 20 may include an electronic calendar and a clock. Most people do have some daily routines, which are repeated week after week. Most people work five days a week—often from nine to five.

According to the invention, the personal communication device 20 includes a connectivity component 29 that may communicate with the hearing aid 10 and therefor preferably operates under the Bluetooth Core Specification, version 4.0.

The personal communication device 20 includes a User Interface (UI) 27, such as a touch display, presenting content, input screens, and notifications to the user and allowing the user to input instructions and commands. An NFC reader 28 allows the personal communication device 20 to interact with an NFC tag 34 or unit for reading the code associated therewith.

The personal communication device 20 may be a mobile phone having a microphone 21, a speaker 22, and a processor 23 controlling the operation. The personal communication device 20 is intended to provide the user a wide variety of communication services, and for this purpose the personal communication device 20 includes a wireless transceiver, such as a Radio Frequency (RF) component 25 and a corresponding antenna module 26.

The RF component 25 is controlled by the system software run on the processor 23 and includes a cellular part 31 for communication (mobile phone calls and data connection) over a cellular network using cellular protocols such as GSM (2G), WCDMA (3G) and/or LTE (4G)—whereby the personal communication device 20 is able to connect to the Internet 35. When accessing a cellular network, the personal communication device 20 links up to a base station in the cellular network. This base station is named by the network operator, and the name or the Cell-ID is a generally unique number used to identify each Base Transceiver Station (BTS), and is a rough indication of the current location of the personal communication device 20. The processor 23 keeps track on available base stations, the one to which the personal communication device 20 is currently connected, and manages hand-overs when required.

Even through there is a significant uncertainty when using the Cell-ID for exact determination of a position, the telephone may know an additional parameter named Timing Advance which represent a measure for the distance to the Base Transceiver Station, and by keeping track of the telephones Base Transceiver Station history, the auxiliary classifier 24 may easily recognize a pattern as most people have fixed routine in commuting between home and work and in addition to this doing a little sport and shopping. These details may be flagged in the calendar so the app controlling the auxiliary classifier 24 may retrieve the details including category and timing directly from the calendar.

The RF component 25 may furthermore include a WLAN modem 32 preferably operating according to the IEEE 802.11 protocol (including one or more of the standards 802.11a, 802.11g and 802.11n). Hereby the personal communication device 20 is able to connect to the Internet 35 via a router 30 when permitted to access the WLAN network. When the WLAN modem 32 is switched on, the processor 23 maintains a list of available WLAN networks, and this knowledge can be used to determine whether the personal communication device 20 is at home, at work or at some other position previously defined by the WLAN network access. The processor 23 manages the handshaking when a permitted WLAN network is accessible. The processor 23 may also manage a list of all available WLAN networks in the surroundings—not only the one to which the personal communication device 20 is connected.

The RF component 25 may furthermore include a GPS receiver 33 receiving satellite signals, and based on the signals calculating a representation for the current position of the personal communication device 20. This representation or coordinates may be used for navigation, but is actually also a quite precise indication of the current position of the personal communication device 20. When GPS receiver 33 is switched on the processor 23 often uses the coordinates for presenting the current position on a displayed map. Most GPS apps are able to extract the current speed of the personal communication device 20, and this may be used as an indication of the current use—and indicate travelling e.g. by car or train. The external auxiliary classifier 24 may disregard the GPS receiver 33 as information source, when the GPS receiver 33 is turned off for power saving reasons.

Furthermore the connectivity component 29 (Bluetooth module) may be used in various situations—for example for connecting the personal communication device 20 to a hands-free system of a car. Bluetooth hands-free options are today easily found in mid and high-end cars as an integrated part of the cars stereo system. The system software of the processor 23 manages the hands-free profile, and such a hands-free profile has been standardized as "*SIM ACCESS PROFILE Interoperability Specification*" by the Bluetooth® Special Interest Group (SIG), Inc.

During the past decade, one of the strategies to improve the hearing skills of a hearing impaired person has been to analyze the auditory environment of the hearing aid user in order to identify useful sound components and noise, and using this knowledge to remove the identified noise from the audio signal presented to the hearing aid user. This signal analysis and subsequent classification of the audio signal picked up may include simultaneously examination of three specific characteristics inherent in the analyzed signals. The first specific characteristic may be the Intensity Change. The Intensity Change is defined as the change in the intensity of the audio signal over a monitored time period. The second specific characteristic may be the Modulation Frequency. The Modulation Frequency is defined as the rate at which the signal's intensity changes over a monitored time period. The third specific characteristic may be the Time. The Time is simply defined as the duration of the signal.

Figure 2:
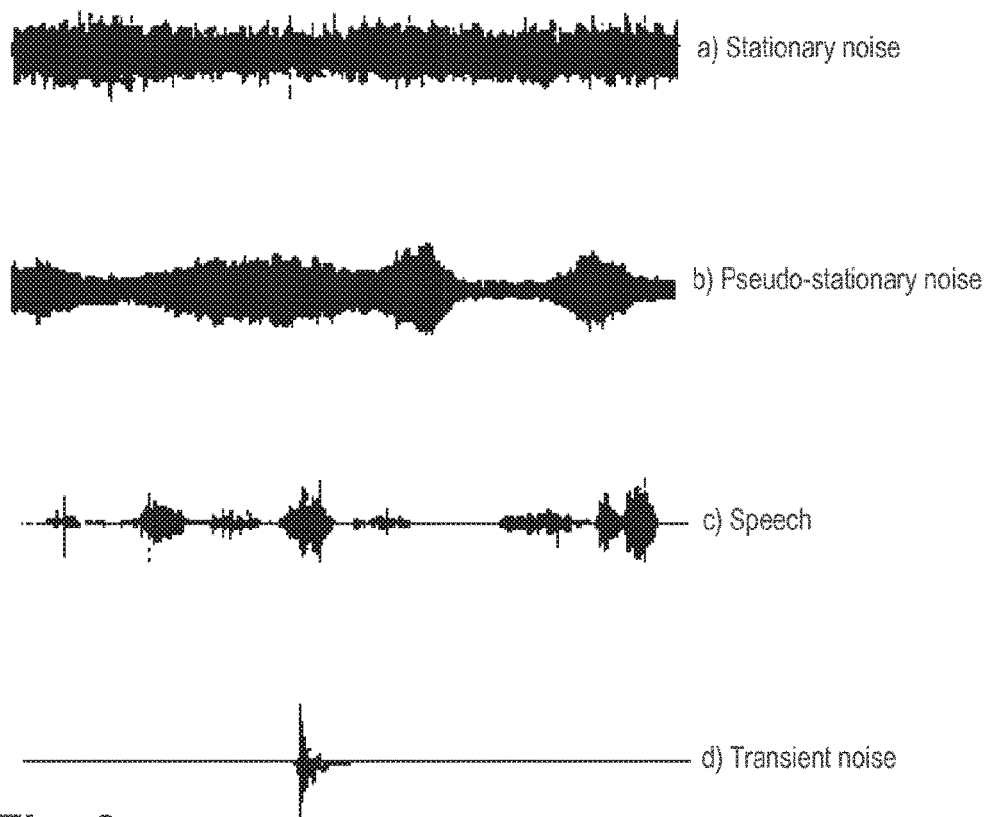
FIG. 2 shows four categories of an audio signal observed in a hearing aid—illustrated as amplitude versus time.

FIG. 2 shows four categories of audio signal that may be observed in a hearing aid—illustrated as amplitude versus time.

The first audio signal example labeled "a) Stationary noise", is characterized in that it is stable during the analyzing period of e.g. a couple of seconds. Furthermore the intensity does not change and the signal is not modulated—in other words the spectral composition remains the same during the analyzing period. The typical source for stationary noise includes an air conditioner or an engine.

The second audio signal example is labeled "b) Pseudo-stationary noise", and it is characterized in that it is substantially stable during the analyzing period—even though modulation may be observed. The typical source for pseudo-stationary noise includes traffic noise and a crowd of people splitting into smaller groups having individual conversations (cocktail party).

The third audio signal example is labeled "c) Speech". Speech is characterized in that it is heavily modulated with silent parts in between. If analyzing the frequency domain in addition, it may be seen that the individual sounds vary in frequency, too.

The fourth audio signal example is labeled "d) Transient noise". The typical source for transient noise may be door-slamming, shooting or hammering. Common for transient noise is that the noise is extremely uncomfortable when amplified and output directly in the ear. The transient noise is not used for automatically program selection but the hearing aid, upon detection of such a sound, seeks to cancel out the sound without amplifying it.

The continuum between audio signal examples and the specific characteristics are listed in table 1 below.

TABLE 1 illustrates the correlation between specific characteristics
of audio signal and origin of the received audio signal.

|  | Stationary noise | Pseudo-stationary noise | Speech | Transient noise |
|---|---|---|---|---|
| Intensity Change | Small < | | | > Significant |
| Modulation Frequency | low < | | | > high |
| Duration of the signal (time) | stable < | | | > short |

Figure 6:
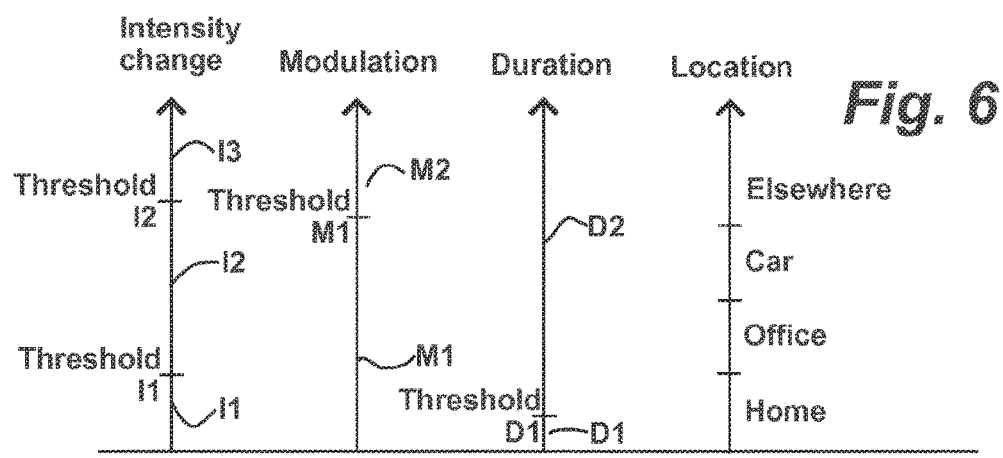
FIG. 6 illustrates possible decisions made by a first embodiment of the classifier and the auxiliary classifier according to the invention.

Now referring to FIG. 6, the three specific characteristics parameters "Intensity change", "Modulation", and "Duration" is shown. For "Intensity change", the dynamic range is divided into three intervals, I1, I2 and I3, by providing two thresholds, "Threshold I1" and "Threshold I2". Similar to this the "Modulation" divided into two intervals, M1 and M2, by means of a threshold, "Threshold M1", and the "Duration" is divided into two intervals, D1 and D2, by means of a threshold, "Threshold D1". From the external auxiliary classifier 24, the programs selector 16 receives location input—here marked as "Home", "Office", "Car" and "Elsewhere".

Hereby you are able to associate the specific characteristics parameter intervals into bins, and handle the bins as a histogram so the most significant bin is used by the program selector 16 for automatic selection of the hearing aid program best fitting the auditory environment and user behavior. For example when driving in a car, the car engine has a characteristic noise pattern that may be suppressed as it does not add any valuable information to the user if amplified.

TABLE 2 illustrates how noise landscapes and position information may
be put together in a histogram used for program selection.

| Bin | Intensity Change | Modulation Frequency | Duration | Location |
|---|---|---|---|---|
| 1 | I1 | M1 | D1 | Home |
| 2 | I1 | M1 | D1 | Office |
| 3 | I1 | M1 | D1 | Car |
| 4 | I1 | M1 | D1 | Elsewhere |
| 5 | I1 | M1 | D2 | Home |
| 6 | I1 | M1 | D2 | Office |
| 7 | I1 | M1 | D2 | Car |
| 8 | I1 | M1 | D2 | Elsewhere |
| 9 | I1 | M2 | D1 | Home |
| 10 | I1 | M2 | D1 | Office |
| 11 | I1 | M2 | D1 | Car |
| 12 | I1 | M2 | D1 | Elsewhere |
| 13 | I1 | M2 | D2 | Home |
| 14 | I1 | M2 | D2 | Office |
| 15 | I1 | M2 | D2 | Car |
| 16 | I1 | M2 | D2 | Elsewhere |
| 17 | I2 | M1 | D1 | Home |
| 18 | I2 | M1 | D1 | Office |
| 19 | I2 | M1 | D1 | Car |
| 20 | I2 | M1 | D1 | Elsewhere |
| 21 | I2 | M1 | D2 | Home |
| 22 | I2 | M1 | D2 | Office |
| 23 | I2 | M1 | D2 | Car |
| 24 | I2 | M1 | D2 | Elsewhere |
| 25 | I2 | M2 | D1 | Home |
| 26 | I2 | M2 | D1 | Office |
| 27 | I2 | M2 | D1 | Car |
| 28 | I2 | M2 | D1 | Elsewhere |
| 29 | I2 | M2 | D2 | Home |
| 30 | I2 | M2 | D2 | Office |
| 31 | I2 | M2 | D2 | Car |
| 32 | I2 | M2 | D2 | Elsewhere |
| 33 | I3 | M1 | D1 | Home |
| 34 | I3 | M1 | D1 | Office |
| 35 | I3 | M1 | D1 | Car |
| 36 | I3 | M1 | D1 | Elsewhere |
| 37 | I3 | M1 | D2 | Home |
| 38 | I3 | M1 | D2 | Office |
| 39 | I3 | M1 | D2 | Car |
| 40 | I3 | M1 | D2 | Elsewhere |
| 41 | I3 | M2 | D1 | Home |
| 42 | I3 | M2 | D1 | Office |
| 43 | I3 | M2 | D1 | Car |
| 44 | I3 | M2 | D1 | Elsewhere |
| 45 | I3 | M2 | D2 | Home |
| 46 | I3 | M2 | D2 | Office |
| 47 | I3 | M2 | D2 | Car |
| 48 | I3 | M2 | D2 | Elsewhere |

Figure 3:
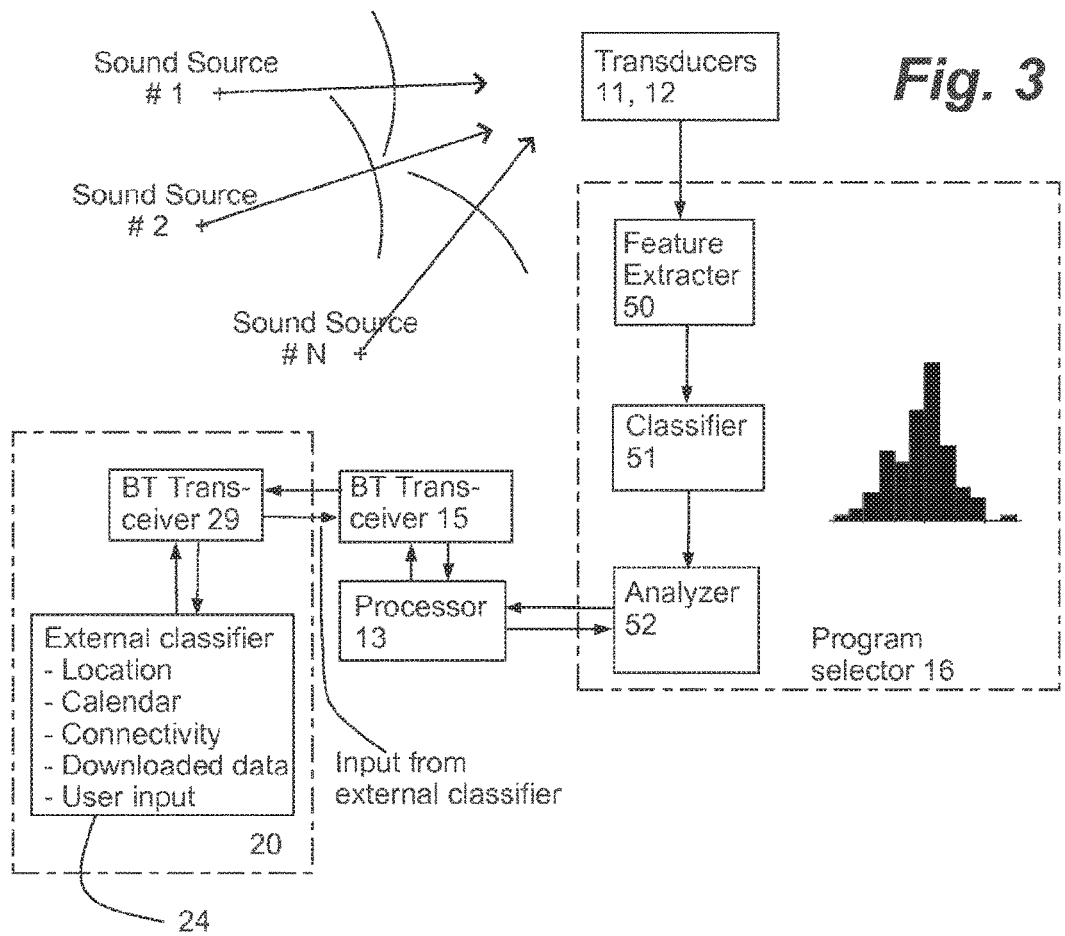
FIG. 3 illustrates program selection according to the first aspect of the invention.

With reference to FIG. 3, the operation of the programs selector 16 will be discussed. The transducers 11, 12 receive sound from a plurality of sound sources #1, #2, . . . , #N. The program selector 16 includes a feature extractor 50 being adapted to analyze an audio signal sample by determining characteristic parameters as the "Intensity Change", the "Modulation Frequency" and the "Duration" of the signal. These parameters are handed over to a classifier 51 being adapted to classify the audio signal sample by comparing the determined characteristic parameters with some predetermined threshold values. The classifier 51 updates a histogram by incrementing the appropriate bin by one.

An analyzer 52 monitors the histogram and identifies the dominant bin to represent the current noise landscape, and the analyzer 52 instructs the DSP 13 to select the corresponding program accordingly. The analyzer 52 outputs a command to the DSP 13 to select a program and/or set programs parameters according to current noise landscape. The analyzer 52 may further adjust the time between subsequent noise samples fed to the classifier 51 in dependence of the histogram whereby a surrounding noise landscape is monitored more intensively when the landscape is inhomogeneous (no dominant bin in the histogram). In order to make changes in the auditory environment detectable, exponential forgetting has been implemented in order to ensure that new auditory samples fed to the classifier are weighted higher than older samples.

The Digital Signal Processing (DSP) unit 13 includes a plurality of algorithms for manipulating the input signals prior to presenting the processed signal for the user. These algorithms may be regarded as sub-systems as their behavior may be varied by changing settings for the algorithm.

When the auxiliary classifier 24 detects a change, the processor 23 initiates the transmission of an update notification to the hearing aid 10. The update notification is prepared as a data package with a header (supplemental data placed at the beginning of a block of data being transmitted). It is important that header composition follows a clear and unambiguous specification or format, to allow for parsing. The data package is transmitted from the connectivity component 29 to the connectivity component 15. Based on the header, the update notification is led to the analyzer 52 which takes this additional information into account when selecting a program or a sub-system.

One example on such a sub-system may be a directional microphone system. One such program or sub-system available from Widex A/S under the name HD Locator™ consists of two omnidirectional microphones 11, 12. The microphone system is adaptive, meaning that it will assume the polar pattern that produces the best signal-to-noise ratio in the current listening environment. In other words, noise is suppressed by employing input dependent directional patterns.

In a quiet environment with limited noise, the microphone system will assume the omnidirectional pattern where it picks up sound evenly from all directions. However, if noise is present, the system will assume the directional pattern which leads to the least amount of noise being picked up. If the noise source is located behind the hearing aid user, for instance, the microphone system will assume a cardioid pattern which picks up sound from the front and eliminates most sound from the sides and from the behind.

This means the adaptive directional pattern can operate in several independent frequency bands that the directional pattern assumed to suppress the noise can be limited very narrowly to the frequency areas where the noise is actually present. If a low frequency noise source (e.g. the engine of a car) is located in one direction and a high frequency noise source (e.g. an espresso machine) in another, a dual microphone system can reduce the sensitivity to both sources of noise independently, effectively reducing the total amount of noise that hearing aid user will hear.

Another example on such a sub-system may be a transposing system. The loss of audibility of high frequency sounds often compromises speech understanding and the appreciation of music and nature's sounds. A transposing program or sub-system is available from Widex A/S under the name Audibility Extender™. This sub-system transforms inaudible sounds, such as high-frequency speech sounds, and environmental sounds like birdsong, a doorbell, music, etc. to a frequency region where they are audible. This preferably takes place by employing a linear frequency transposition, whereby the important harmonic relationship of sound is retained. This is important for the user experience of specific sounds for the hearing aid wearer.

The transposing sub-system is essential for assisting the user to improve the speech perception as phonemes such as /s/, /ʃ/, /t/, /z/ are difficult to discriminate if you have a hearing loss in the high frequencies. In spoken English being able to discriminate /s/ and /z/ is important because these phonemes mark plurals, possessions and contractions as well as the third person singular tense.

A third example on such a sub-system may be a feedback cancellation sub-system. Feedback occurs because the amplified sound from the hearing aid is picked up at the hearing aid microphone and allowed to pass through the hearing aid again, eventually resulting in the high-frequent whistling sound. The feedback cancelling system analyzes the incoming signal, and in case the signal is found to be audible feedback whistling, gain will be reduced at the affected frequency to provide a stable sound without feedback whistling. When listening to music, feedback cancellation shall be reduced as e.g. the sound of strings may be interpreted as an audible feedback whistling and therefor cancelled unintentionally.

Room Reverberation Characteristics

Understanding speech in noisy conditions is usually a primary objective for hearing aid users. In certain reverberant environments, such as churches, auditoriums, theaters, the speech audibility for hearing aid users is very challenging. Reverberation is caused by multi-path propagation of the audio signal where the audio signal received by the listener is composed by the direct propagated signal and one or more reflected contributions (multi-path propagation). The human brain is able to extract information about the room from the heard sound due to the reverberation. For hearing aid users, the reverberation causes a noisy audio environment, and therefor some binaural hearing aids have algorithms seeking to remove contribution from reflected signal paths. If the theatre or concert hall is not equipped with appropriate acoustic panels, unwanted sound reflections are produced. This increases reverberations that make it difficult for the audience to hear the dialogue or music clearly. The challenges of hearing aids in reverberant environments have been discussed in "Simulated Reverberation and Hearing Aids" by M. Izel et al, presented at the American Academy of Audiology National Convention 1996, Salt Lake City, Utah.

The multi-path signals depend on size of the room and the surfaces used in the walls, the floor and the ceiling. The size of the room determines the delay of the echoes, and the surfaces determine the relationship between the absorbed and reflected energy—and thereby the relationship between the direct signal and the echoes. The delay value for a room may be estimated by using a formula called RT60. The first early reflection reaches the listener shortly after the direct signal does as the path is longer. The difference in time between the arrival of the direct signal and the first early reflections is measured in milliseconds. Currently de-reverberation takes place by estimating the room reverberation characteristics by analyzing the received audio signal, and then applying various filters in the hearing aid for suppressing the echoes.

Preferably, the operators of such reverberant environments, such as churches, auditoriums, theaters, may as a service make the room reverberation characteristics for the major rooms or halls available for the hearing impaired users. One way of making these data available for the users or customers is by embedding the data into an NFC tag 34 (FIG. 1). By printing appropriate icons or descriptive text on the NFC tag 34, the user will be able to obtain the room reverberation characteristics by means of his NFC enabled personal communication device 20. The data embedded into the NFC tag 34 includes a header informing the processor 23 how data shall be handled when parsed. Thereafter the auxiliary classifier 24 extracts the relevant parameters and transfers these parameters to the programs selector 16 of the hearing aid where the appropriate program is selected and the parameters for the de-reverberation are based on the room reverberation characteristics achieved by means of the personal communication device 20.

Alternatively, the room reverberation characteristics may be accessed via a Location Based Service. The application software running on the personal communication device 20 retrieves the room reverberation characteristics from a memory 41 of the remote server 40. This may be done by up-loading the current position of the personal communication device 20 to the remote server 40, and the remote server 40 will provide the room reverberation characteristics in response.

According to yet an alternative embodiment, the personal communication device 20 may acquire the URL of the desired room reverberation characteristics from the NFC tag 34, and then access the desired data via the Internet 35. The operators of reverberant environments may as a service make the room reverberation characteristics available for the hearing impaired users on the server 40 via the Internet 35. Once the room reverberation characteristics have been acquired by the auxiliary classifier 24, the control of the hearing aid 10 upon downloading the room reverberation characteristics is basically the same as if the room reverberation characteristics were acquired from the NFC tag 34.

Instead of having a separate service for the room reverberation characteristics, the data can be included in an Augmented-Reality-like service where artificial information about the environment and its objects may be overlaid on the real world camera view. The room reverberation characteristics data may be handled as a kind of Virtual Graffiti and shall include an identifier to enable the personal communication device 20 to direct the data towards the auxiliary classifier 24. Virtual Graffiti consists of virtual digital messages provided and maintained by individuals. The Virtual Graffiti applications utilize Augmented or Virtual Reality and Ubiquitous Computing to anchor a message to a physical landmark in the real world. Now again, once the room reverberation characteristics have been extracted by the auxiliary classifier 24, the control of the hearing aid 10 is basically the same as if the room reverberation characteristics were acquired from the NFC tag 34.

The hearing aid 10 according to the invention is able to receive and handle one or more externally defined classifier categories, and the personal device 20 is able to classify the current use into these externally defined classifier categories, and offer these categories to the hearing aid 10. If the personal device 20 and the hearing aid 10 become disconnected, the programs selection of the hearing aid 10 is handled just under control of the classifier 51.

Once the appropriate software application has been downloaded and installed, the user may pair the personal device 20 and the hearing aid 10. This may be done by switching on the hearing aid 10, which will enable Bluetooth for a predetermined period. This period may be five minutes or shorter. Advantageously this period may be just one minute, but extended to e.g. two minutes if the hearing aid 10 detects a Bluetooth enabled device in its vicinity. During this period, the hearing aid will search for Bluetooth enabled devices, and when one is found, the hearing aid may play back a security code in audio, in order that the user can key in the security code on the personal device 20. The connection is established and the personal device 20 may from now on communicate with the hearing aid 10.

Figure 4:
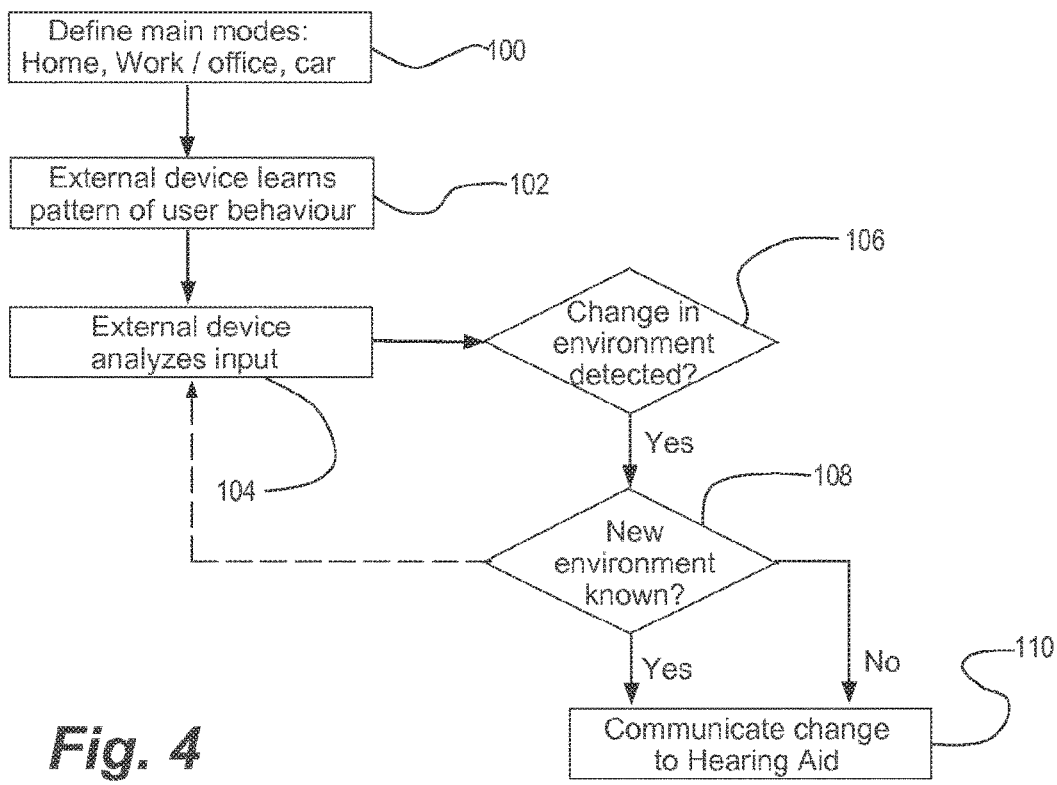
FIG. 4 illustrates a method of selecting programs in a hearing aid according to a first aspect of the invention.
Figure 5:
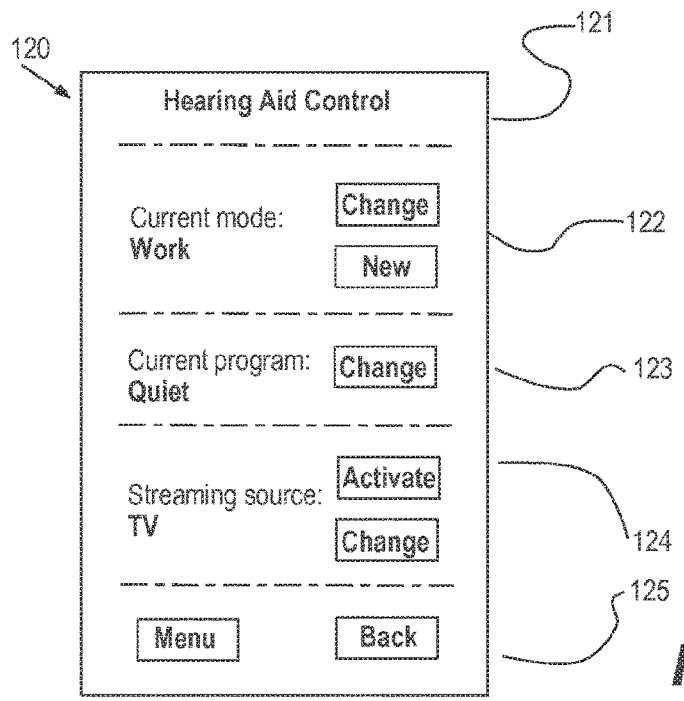
FIG. 5 illustrates the user interface for application software for controlling a hearing aid and serving as an auxiliary classifier according to an embodiment of the invention.

Once the hearing aid app having a user interface 120 (Touch screen shown on FIG. 5 with an apps name area 121) is operating according to the invention, the user may at step 100 in FIG. 4 start to define his basic locations. This is done by means of the application software for controlling a hearing aid, where the user may press a "NEW" virtual key in a mode section 122. Then the user is invited to enter a mode label in a per se known manner by means of a virtual keypad (not shown). Examples of useful, user defined Behavior Modes appear from table 3. Once a Behavior Mode is defined, the personal device 20 lists in step 102 any control input, as Cell-ID, WLAN connection, being available, and as long as these control inputs are available, the auxiliary classifier 24 assumes—in step 104—that the personal device 20 remains in this location and thereby in this mode. The user sets up all the Behavior Modes he wants to define one by one when he is present in the appropriate location. When the auxiliary classifier 24 detects a change in the environment in step 106, it checks in step 108 whether the new environment is known or not. The auxiliary classifier 24 operates with a mode named "Unknown" which is used if none of the predefined modes is detected. When a mode change is detected, the mode change and the new mode is communicated in step 110 to the hearing aid 10, and the auxiliary classifier 24 continues monitoring the use of the personal device 20 at step 104.

The user interface 120 of the personal device 20 offers the user in the mode section 122 the opportunity to manually set the mode to one of the previously set modes, which is done by pressing the "Change" button, which preferably will offer the user a selector list to choose from. The hearing aid 10 communicates via the short range data communication link to personal device 20 which program is currently selected by the program selector 16. The user may via a program selection section 123 change the currently selected program by pressing the "Change" button which preferably will offer the user a selector list to choose from. This selector list preferably offers the user a possibility to maintain the selected program by doing some fine tuning. Via a streaming source section 124, the user may activate and change the streaming source by pressing the "Activate" button and the "Change" button, respectively. Pressing the "Change" button will offer the user a selector list to choose from. The personal device 20 may manage the streaming from television, FM radio or telephone. Finally a menu control section 125 allows the user access to the entire app menu and to escape the app.

TABLE 3 illustrates which inputs to the auxiliary classifier can be used to define the current Behavior Modes.

| Behavior Mode | Indicator |
| --- | --- |
| Home | Time, Cell-ID, WLAN Router name |
| Car | Bluetooth connection, GPS (speed) |
| Office/Work | Time, Cell-ID, WLAN Router name |
| Church | Time, Cell-ID |
| Favorite restaurant | Time, Cell-ID, WLAN Router name |
| Concert hall, Auditorium, theatre, cinema | Calendar, NFC tag/"Virtual Graffiti", GPS location |

Figure 7:
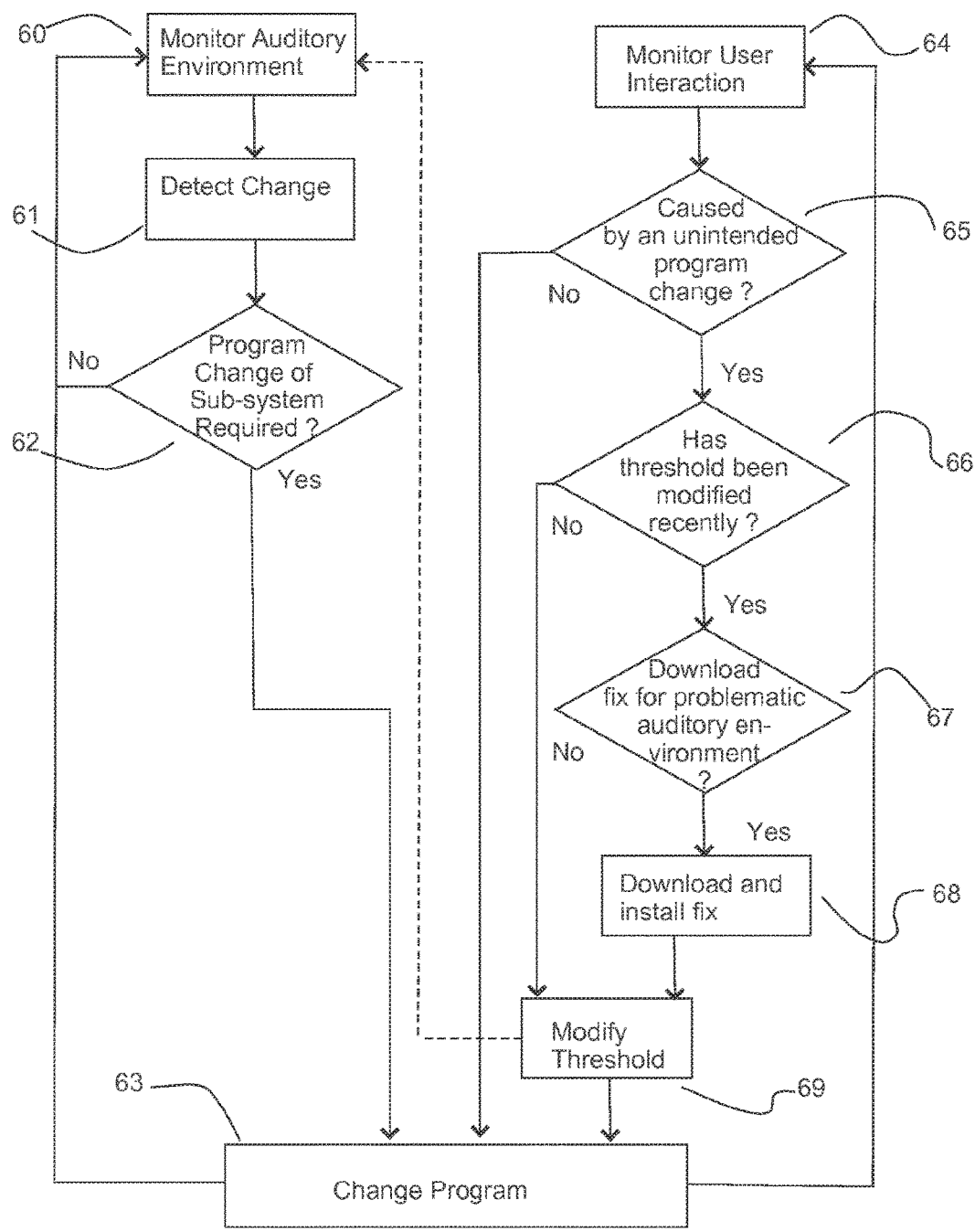
FIG. 7 shows a flow chart for a method according to an embodiment of the invention for changing program for a sub-system and modifying thresholds adaptively.

FIG. 7 illustrates a method according to the invention, and, according to this method, the program selector 16 monitors the auditory environment in step 60 by analyzing samples—preferably of a predetermined duration—and classifying the individual sample based upon its specific characteristics. The statistical analysis of the classifier 51 includes comparison of the individual samples to one or more thresholds for each of the specific characteristics as seen in FIG. 6, and, in dependence of the comparison incrementing the value of the appropriate bin in the histogram shown in FIG. 3. When the analyzer 52 in step 61 detects a change in the histogram (a new bin peaks), it investigates whether the new classification is associated with a program different from the one currently used, and if this is the case, the program selector 16 automatically changes the program in step 63. After identifying the new peaking bin in step 61, evaluating the need for changing program in step 62, and changing program in step 63 if required, the program selector 16 goes back to step 60 monitoring the auditory environment for detecting the next change in the auditory environment or in the user behavior.

In parallel to the monitoring of the auditory environment and the user behavior, the program selector 16 also monitors the user interaction in step 64. This user interaction refers to the user interface 120 shown in FIG. 5 for application software run on the personal communication device 20 according to an embodiment of the invention. The inputs are communicated from the personal communication device 20 to the hearing aid 10 via the short range data connection provided by the two connectivity components 15, 29—the Bluetooth™ transceivers. By pressing the "Change" button in the program selection section 123, the user will according to the preferred embodiment be offered a selector list to choose from. This selector list preferably offers the user a possibility to undo a program change recently (e.g. within the last minute) initiated by the program selector 20, and also to do some fine-tuning by indicating that more or less bass or treble is desired, that wind noise is problematical, or that a specific program is manually selected until automatic program selection is activated again.

The processor 13 analyzes the observed user interaction in step 65, and an "undo a program change" command shortly after an automatic program change has taken place is by the processor 13 interpreted as an erroneous program change. Therefor the processor 13 analyzes the form of the histogram calculated by the classifier 15—is there a significant peak indicating that the auditory environment is homogeneous or are two or more peaks indicating that the auditory environment is heterogeneous. A heterogeneous auditory environment can be interpreted as the auditory environment being fluctuating or as the auditory environment transitioning from one audio type to another. Several different bins in the histogram may lead to the selection of a specific program. If the processor 13 deems the auditory environment to be fluctuating, it starts analyzing the individual values for the specific characteristics for each sample. When the analysis carried out in step 65 shows that a significant proportion of the values are close to one of the thresholds shown in FIG. 6, and when the thresholds have not been modified recently (step 66), the processor 13 adjusts in step 69 the specific threshold so the individual values for the specific characteristic will substantially fall in the interval pointing towards the program selected by the user. It is marked with a dotted arrow that the adaptive adjustment affects the monitoring of the auditory environment in step 60.

By adjusting the thresholds used by the classifier adaptively, the auditory environment will shift from being regarded as heterogeneous towards being homogeneous. Hereby the risk of the program selector 16 causing a programs change due to a misinterpretation of the auditory environment is significantly reduced. After detecting a user interaction in step 64, evaluating the need for adaptively adjusting an appropriate threshold in step 65, and actually changing the threshold in step 66 if required, the processor 13 goes back to step 64 waiting for the next user interaction.

Preferably the adaptive adjustment of the thresholds is handled in the hearing aid 10 itself as explained above. However, as the personal communication device 20 may be a smartphone and therefor include a processor, too, the implementation of the invention may include that the processor 13 via the short range data connection transmits the individual values for the specific characteristics for each sample and the thresholds currently used to the personal communication device 20. Then the personal communication device 20 calculates an appropriate new set of thresholds—e.g. by ensuring that the individual values when Gauss-distributed has a significant proportion—e.g. at least 75% or preferably above 90%—of the values in the appropriate interval or bin.

Preferably, the auxiliary classifier 24 uploads the new set of thresholds to the remote server 40, together with the statistical data from the classifier 51, and an indication of user satisfaction. User satisfaction may be entered actively by a rating screen with e.g. a 1-5 stars rating, or passively based on no further changes requested. These statistical data from the classifier 51 may include the actual counts in the histogram or the set of individual values for the specific characteristics for each audio sample. Preferably both are included. The remote server 40 stores the uploaded data set in data storage 41. The uploaded data is in a predefined format controlled by the database/server operator and specified in the downloadable apps. Hereby the uploaded data set may be clustered with similar uploaded thresholds, and the data set is available for calculating future factory threshold settings for classifiers, and fixes or solution offerings for specific problematic auditory environment. These solution offerings may include threshold settings for the classifier dealing with a problematic auditory environment or settings for one of the sub-systems controlled by the program selector 16—e.g. the transposer where the downloadable settings assist the hearing aid to suppress or emphasize certain characteristics in a problematic auditory environment.

According to an embodiment of the invention the processor 13 of hearing aid 10 manages the adjustments when a user interaction via the personal communication device 20 has indicated that the current performance is unsatisfying. In rare situations, the processor 13 is not able to adjust the classifier thresholds in a way so the hearing aid user is satisfied with the performance, so when the auxiliary classifier 24 in step 66 realizes that the threshold has been modified recently—e.g. the second request made with a few minutes—the auxiliary classifier apps will prompt the user for downloading a fix for dealing with a problematic auditory environment in step 67, and if the user confirms, the personal communication device 20 uploads in step 68 a request for a solution including the relevant history and the current settings to the remote server 40. The server analyzes the problem automatically—or assisted by an audiologist—and responds by sending the requested settings including the thresholds. Once the settings have been received, the personal communication device 20 transfers the settings to the hearing aid 10 in step 69 where the processor 13 stores the thresholds as if the thresholds had been calculated by the processor 13 itself and changes program in step 63 if the settings included a new designated program.

Figure 8:
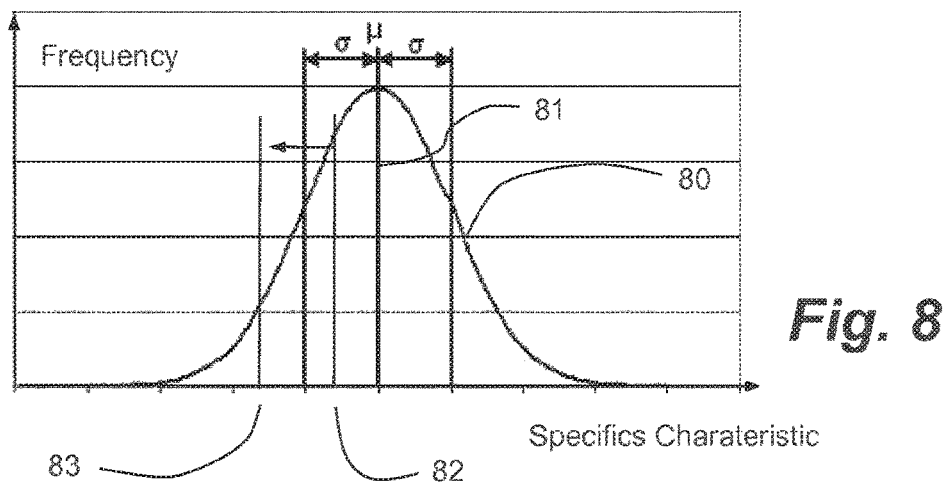
FIG. 8 illustrates the distribution for a specific characteristic audio samples of an auditory environment being substantially homogeneous.

For a sequence of samples for an auditory environment being substantially homogeneous, the samples will, when the specific characteristic is measured for the classification, assume exact values being distributed substantially according to the normal (or Gaussian) distribution. This is illustrated in FIG. 8 where the frequency (y-axis) is plotted as a function of the values for the specific characteristic (x-axis). The frequency of the exact values is shown as a curve 80, and the distribution has a center of gravity or mean value, $\mu$, marked as a value 81.

The Gaussian distribution has the standard deviation, $\sigma$, and the variance $\sigma^2$. The parameters are easily calculated based upon the actual value set, and may be used for characterizing the curve 80. For example, approximately 68% of the total number of exact values will fall in the range defined by the mean value, $\mu$, +/− the standard deviation, $\sigma$. FIG. 8 shows a threshold value 82 for the specific characteristic, and when the mean value, $\mu$, of the audio samples for the auditory environment falls close to threshold value 82, there will be a risk that the classifier 51 will toggle between the two intervals divided by the threshold 82—even though the auditory environment is quite stable with a small standard deviation $\sigma$. This may result in unintended program changes.

When the analyzer 52 has detected that the auditory environment is heterogeneous, the processor 13 investigates the reason. If the processor 13 realized that the actual value set follows a Gaussian distribution and that the standard deviation, σ, is smaller than a predetermined value—this predetermined value is small compared to the overall range for the specific characteristic, less than e.g. 10% of the overall range and preferably less than e.g. 5% of the overall range, and that the threshold 82 falls in a distance from the mean value, μ, smaller than the standard deviation, σ;

then the processor 13 adjusts the threshold in the direction indicated by the arrow to a new threshold value 83.

The threshold value adjustment may preferably be:

in fixed steps e.g. corresponding to the predetermined value to which the standard deviation, σ, is compared, the calculated standard deviation, σ, or a value ensuring that the new, adjusted threshold is in a distance from the mean value, μ, corresponding to the standard deviation, σ.

Preferably the adjusted thresholds are maintained until the auditory environment changes again, and hereafter the thresholds assume the originally set values. However the processor 13 may beneficially remember past amendments if the adjusted thresholds have been amended in a similar way several times.

EEG (Electroencephalography) is recording of electrical activity along the scalp, and the recordings may provide information about the brain activity or the mental state of the person. EEG electrodes may be provided integrally with the hearing aid (not shown)—e.g. inside the ear canal and/or on a hearing aid housing placed behind the ear. Based on the EEG recording there may be provided a specific characteristic representation of the hearing aid user's mood.

The adaptive classifier according to one aspect of the invention was with reference to FIGS. 7 and 8 described for amending one threshold for one specific characteristic. However, according to a further aspect of the invention you may have multiple specific characteristics available for the program selector 16. These characteristics may include characteristics related to the audio signal, to the location of the hearing system (the hearing aid 10 and the personal communication 20), to the clock (actual time of the day), to the calendar of the personal communication 20, and to the mood of the hearing aid user (the EEG signal).

An adaptive classifier for program selection in a hearing aid and based upon multiple specific characteristics will operate in a multi-dimensional feature space. Such a multi-dimensional feature space is e.g. described by Woźniak and Krawczyk in "*Combined classifier based on feature space partitioning*" in International Journal of Applied Mathematics and Computer Science. Volume 22, Issue 4, Pages 855-866.

Figure 9:
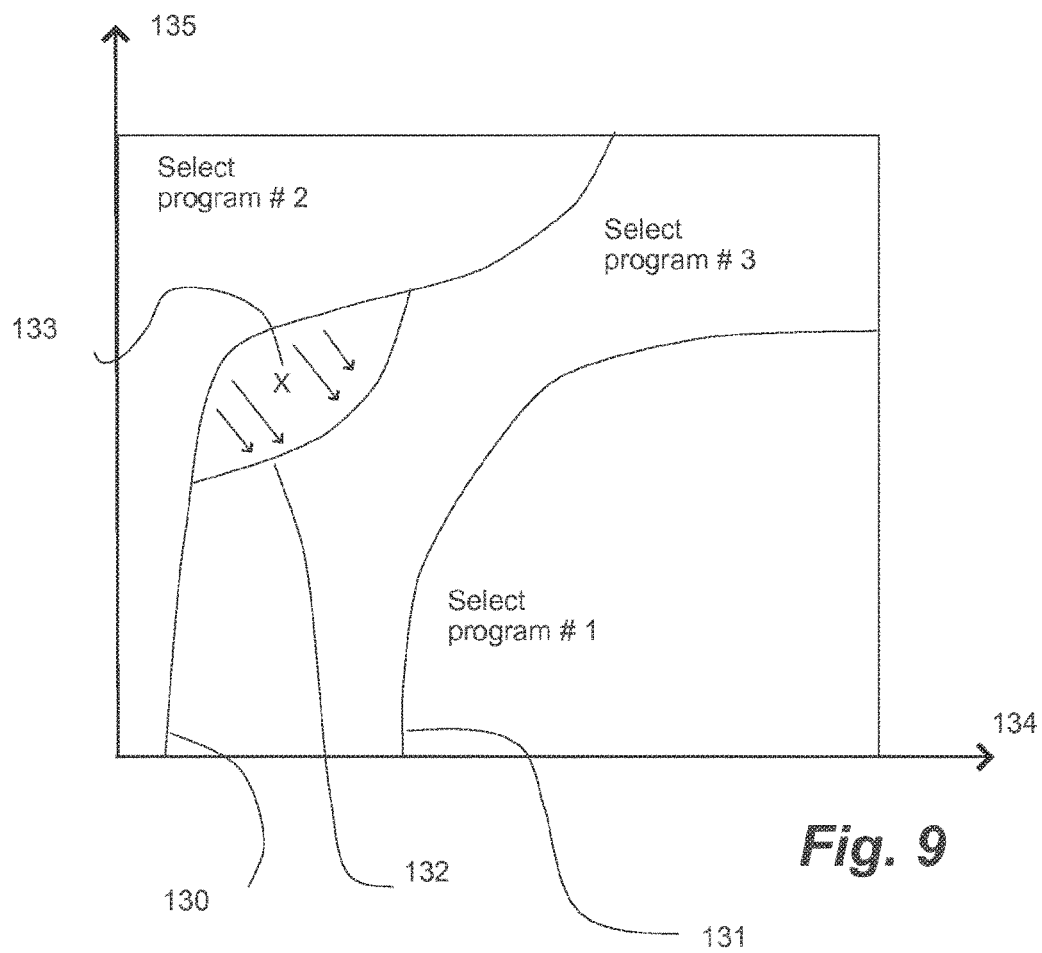
FIG. 9 illustrates a two-dimensional feature space for an adaptive classifier according to an embodiment of the invention.

FIG. 9 illustrates a two-dimensional feature space defined by the axis 134 and 135 representing two of the specific characteristics. Based on user feed-back, the two-dimensional feature space is divided by thresholds 130 and 132 into multiple decisions—here three—selecting hearing aid program #1, #2 or #3, respectively. When the classifier observes that the specific characteristics values are changing in a way so a new decision has to be made—for example that the coordinates for the auditory environment moves from the areas in which hearing aid program #2 is selected to a position 133 where hearing aid program #3 is selected, then the program selector 16 selects hearing aid program #3. If the user changes back the hearing aid program to program #2 as explained above, the processor identifies the change as an error and adapts the threshold curve 130 accordingly, and then future observations falling in the area between the threshold curve 130 and the curve 132 will cause a decision to select the hearing aid program #2.

A multi-dimensional feature space based classifier is very computing-intensive and may require support for vector algorithms. However smartphones are nowadays pretty powerful and will be able to handle such calculations. Hearing aid processors may in the future also become able to handle such calculations.

The thresholds of a multi-dimensional feature space based classifier may be set from factory during the manufacture, and is adapted to adapt the thresholds adaptively when user input is received. Hereby the thresholds will over time mutate from the standard setting to a personalized setting based on the user experience and feed-back.

The invention claimed is:

1. A hearing system including a hearing aid and a personal communication device, the hearing aid and the personal communication device both including a short range data transceiver for providing a short range data communication link, the hearing aid including:

a signal processor processing an electric audio signal according to audio processing parameters of the hearing aid and having a signal processing sub-system with at least two modes of operation;

a classifier component statistically analyzing at least one specific characteristic of an electric input signal, the statistical analysis including comparison of said at least one specific characteristic to one or more thresholds;

the one or more thresholds being controlled by the signal processor;

a program selector component automatically selecting one of the at least two modes of operation for the signal processing sub-system according to the statistical analysis performed by the classifier component;

wherein the personal communication device, during normal use of the hearing aid, offers the user a user interface for controlling and interacting with a program selector component of the hearing aid, and generating a notification according to the operation of the user interface and transmitting the notification to the hearing aid via the short range data communication link; and wherein the signal processor upon reception of the notification from the personal communication device adaptively adjusts at least one of the one or more thresholds used by the classifier component.

2. The hearing system according to claim 1, wherein the processor adjusts at least one of the one or more thresholds when the program selector component has caused an automatic change from a first mode of operation to a second mode of operation, and when the user within a predetermined period of time by operating the user interface overrules the program change.

3. The hearing system according to claim 1, wherein the processor adaptively adjusts the one or more thresholds of specific characteristics ensuring that at least 75% of the individual values for the specific characteristic when Gauss distributed fall in an appropriate interval.

4. The hearing system according to claim 1, wherein the program selector component of the hearing aid is adapted for automatically selecting one of at least two modes of operation for a signal processing sub-system according to the statistical analysis performed by the classifier component.

5. The hearing system according to claim 1, wherein the classifier for program selection is based upon multiple specific characteristics handled in a multi-dimensional feature space for classification of the auditory environment, and mutates adaptively over time from a standard setting to a personalized setting based on the user experience and feedback.

6. A method of selecting one of at least two modes of operation for a signal processing sub-system for a hearing aid including a signal processor processing an electric audio signal according to audio processing parameters of the hearing aid, the method including:
  connecting a personal communication device to the hearing aid by means of a short range data communication link;
  statistically analyzing in a classifier at least one specific characteristic of an electric input signal in order to determine the acoustic environment of the hearing aid, the statistical analysis including comparison of the at least one specific characteristic to one or more thresholds;
  automatically selecting one of the at least two modes of operation for a signal processing sub-system according to the statistical analysis performed by the classifier;
  offering the user by means of the personal communication device a user interface for controlling and interacting with a program selector component of the hearing aid;
  generating, during normal use of the hearing aid, a notification according to the operation of the user interface and transmitting the notification to the hearing aid via the short range data communication link; and
  adaptively adjusting at least one of the one or more thresholds used by the classifier component upon reception of the notification from the personal communication device.

7. The method according to claim 6, comprising the steps of adjusting at least one of the one or more thresholds when the program selector component has caused an automatic change from a first mode of operation to a second mode of operation, and the user within a predetermined period of time by operating the user interface overrules the program change.

8. The method according to claim 6, comprising the steps of managing program selection in the hearing aid by automatically selecting one of at least two modes of operation for a signal processing sub-system according to the statistical analysis performed by the classifier component.

9. A hearing aid communicating with the personal communication device via a short range data communication link, and including:
  a signal processor processing an electric audio signal according to audio processing parameters of the hearing aid;
  a classifier component statistically analyzing at least one specific characteristic of an electric input signal, the statistical analysis including comparison of the at least one specific characteristic to one or more thresholds;
  a program selector component automatically selecting one of at least two modes of operation for a signal processing sub-system according to the statistical analysis performed by the classifier component;
  the signal processor, during normal use of the hearing aid, being adapted to receive a notification from the personal communication device and initiated by a user operating a user interface allowing the user to control the program selector component; and
  the signal processor adaptively adjusting the one or more thresholds of the classifier component upon reception of the notification from the personal communication device.

10. The hearing aid according to claim 9, wherein the processor adjusts at least one of the one or more thresholds when the program selector component has caused an automatic change from a first mode of operation to a second mode of operation, and the user within a predetermined period of time by operating the user interface overrules the program change.

11. The hearing aid according to claim 1, and comprising EEG electrodes provided integrally with the hearing aid, wherein the electric input signal is derived from an EEG signal recorded by the EEG electrodes.

12. The method according to claim 6, and comprising deriving the electric input signal from an EEG signal recorded by EEG electrodes provided integrally with the hearing aid.

13. The hearing aid according to claim 9, and comprising EEG electrodes provided integrally with the hearing aid, wherein the electric input signal is derived from an EEG signal recorded by the EEG electrodes.

14. The hearing system according to claim 1, wherein the electric input signal is a non-audio signal.

15. The hearing system according to claim 14, wherein the electric input signal relates to one of a hearing system location, a time of day, a calendar, or an EEG signal of the hearing aid user.

16. The method according to claim 6, wherein the electric input signal is a non-audio signal.

17. The method according to claim 16, wherein the electric input signal relates to one of a hearing system location, a time of day, a calendar, or an EEG signal of the hearing aid user.

18. The hearing aid according to claim 9, wherein the electric input signal is a non-audio signal.

19. The hearing aid according to claim 18, wherein the electric input signal relates to one of a hearing system location, a time of day, a calendar, or an EEG signal of the hearing aid user.

* * * * *